United States Patent
Chadalapaka et al.

(10) Patent No.: US 9,940,126 B2
(45) Date of Patent: *Apr. 10, 2018

(54) CLUSTER UPDATE SYSTEM

(71) Applicant: Microsoft Technology Licensing, LLC, Redmond, WA (US)

(72) Inventors: Mallikarjun Chadalapaka, Redmond, WA (US); Ali E. Turkoglu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/592,824

(22) Filed: May 11, 2017

(65) Prior Publication Data

US 2017/0249138 A1    Aug. 31, 2017

Related U.S. Application Data

(63) Continuation of application No. 14/709,843, filed on May 12, 2015, now Pat. No. 9,678,739, which is a continuation of application No. 14/053,006, filed on Oct. 14, 2013, now Pat. No. 9,058,237, which is a continuation of application No. 13/229,987, filed on Sep. 12, 2011, now Pat. No. 8,560,662.

(51) Int. Cl.
*G06F 15/16* (2006.01)
*G06F 9/445* (2018.01)
*H04L 29/08* (2006.01)

(52) U.S. Cl.
CPC .............. *G06F 8/65* (2013.01); *H04L 67/34* (2013.01); *H04L 67/10* (2013.01)

(58) Field of Classification Search
CPC ............ H04L 67/34; H04L 67/10; G06F 8/65
See application file for complete search history.

(56) References Cited

U.S. PATENT DOCUMENTS

| | | | | |
|---|---|---|---|---|
| 7,444,349 | B1 * | 10/2008 | Ochotta | G06F 17/30067 |
| 7,761,670 | B2 * | 7/2010 | Holt | G06F 9/526 711/114 |
| 8,122,200 | B2 * | 2/2012 | Holt | G06F 9/526 711/114 |
| 9,678,739 | B2 * | 6/2017 | Chadalapaka | G06F 8/65 |
| 2007/0100828 | A1 * | 5/2007 | Holt | G06F 9/526 |
| 2007/0101057 | A1 * | 5/2007 | Holt | G06F 9/526 711/113 |
| 2008/0133859 | A1 * | 6/2008 | Holt | G06F 9/52 711/163 |
| 2008/0140970 | A1 * | 6/2008 | Holt | G06F 9/52 711/163 |
| 2008/0195617 | A1 * | 8/2008 | Holt | G06F 9/526 |
| 2008/0215701 | A1 * | 9/2008 | Holt | G06F 12/0815 709/213 |

\* cited by examiner

*Primary Examiner* — Moustafa M Meky
(74) *Attorney, Agent, or Firm* — Micheal B. Dodd; Dodd Law Group (57) ABSTRACT

A locking system may place a persistent object on each of the devices in a computer cluster. The objects may indicate that an update is being performed on the devices so that other systems may not also update the devices. When an update has completed, the objects may be removed. The objects may include an identifier for the system owning the objects, as well as other information regarding the update. In some cases, the objects may include executable code and perform some of the update functions on the various devices.

20 Claims, 4 Drawing Sheets

CLUSTER UPDATE SYSTEM

CROSS REFERENCE TO RELATED APPLICATIONS

This application claims the benefit of and priority to U.S. patent application Ser. No. 14/709,843, now U.S. Pat. No. 9,678,739, entitled "Cluster Update System", filed May 12, 2015 by Mallikarjun Chadalapaka et al., the entire contents of which are expressly incorporated by reference. That application claims the benefit of and priority to U.S. patent application Ser. No. 14/053,006, now U.S. Pat. No. 9,058,237, entitled "Cluster Update System", filed Oct. 14, 2013 by Mallikarjun Chadalapaka et al., the entire contents of which are expressly incorporated by reference. That application claims the benefit of and priority to U.S. patent application Ser. No. 13/229,987, now U.S. Pat. No. 8,560,662, entitled "Locking System for Cluster Updates", filed Sep. 12, 2011 by Mallikarjun Chadalapaka et al., the entire contents of which are expressly incorporated by reference.

BACKGROUND

Managing distributed systems, such as computer clusters, can be a very difficult task, especially when updating the systems. In many distributed systems, services provided by the systems may be high uptime services that may be managed during an update so that the services are available from other devices.

SUMMARY

A locking system may place a persistent object on each of the devices in a computer cluster. The objects may indicate that an update is being performed on the devices so that other systems may not also update the devices. When an update has completed, the objects may be removed. The objects may include an identifier for the system owning the objects, as well as other information regarding the update. In some cases, the objects may include executable code and perform some of the update functions on the various devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A system for managing cluster computers may use a locking mechanism to lock the cluster for a particular update. The locking mechanism may involve placing a locking object on each device while the devices are operating. The locking object may signify that the device is locked to other cluster management applications. When a cluster management application encounters a locking object that has a different identity that what is expected, the cluster management application may abort its operation until the previous cluster management application has released the cluster.

In many cases, updates or other modifications to a cluster computer system may interact with other updates. In order to install an update so that other updates do not conflict or interact, the system may lock out other update mechanisms or cluster management applications using a locking object.

Cluster computer systems and other distributed processing systems may be updated while maintaining availability by updating one or more devices within the system while other devices remain available. Such systems may be updated in stages, such as updating one device at a time. As such, the update process may take a relatively long time, from several minutes to several hours or even days or weeks.

The locking mechanism may be used for any maintenance or other operation that may be performed to a distributed processing system while the system remains operational. In this specification, one example may be to implement an update for each of the devices in the system. However, the locking system may be used for any other operation on the system.

One example of a distributed system may be a cluster computing system. Many cluster computing systems operate instances of workloads on different devices so that a failure of any one of the devices in the cluster would not jeopardize the availability of the workload. A cluster computing system may be relatively tightly integrated and may have load balancing mechanisms, high speed networking between the devices, and a management system.

Another example of a distributed system may be a telecommunications routing system where routers may pass communications messages across a network. In many such systems, each router may operate autonomously, yet may be taken offline and have messages passed through other routers or nodes on the network.

In some cases, a distributed system may have workloads that operate largely decoupled or independently from other instances of the workload. For example, a distributed web server may have multiple instances of a web service operating on different devices. Each instance may service incoming requests for web pages, but may not interact with other instances of the workload. Such embodiments may be implemented in a loosely coupled distributed system. For example, the web servers may be located in different parts of a country or even the world, yet still operate in a distributed fashion.

In other cases, a distributed system may have workloads that pass messages between the instances on a frequent basis. For example, a distributed workload that processes finite element analysis or other large computational problems may pass messages between workloads on a very frequent basis. Such embodiments may be implemented in a tightly coupled distributed system, such as a cluster computing system, where the messages may be passed quickly between the devices on a high speed dedicated network.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
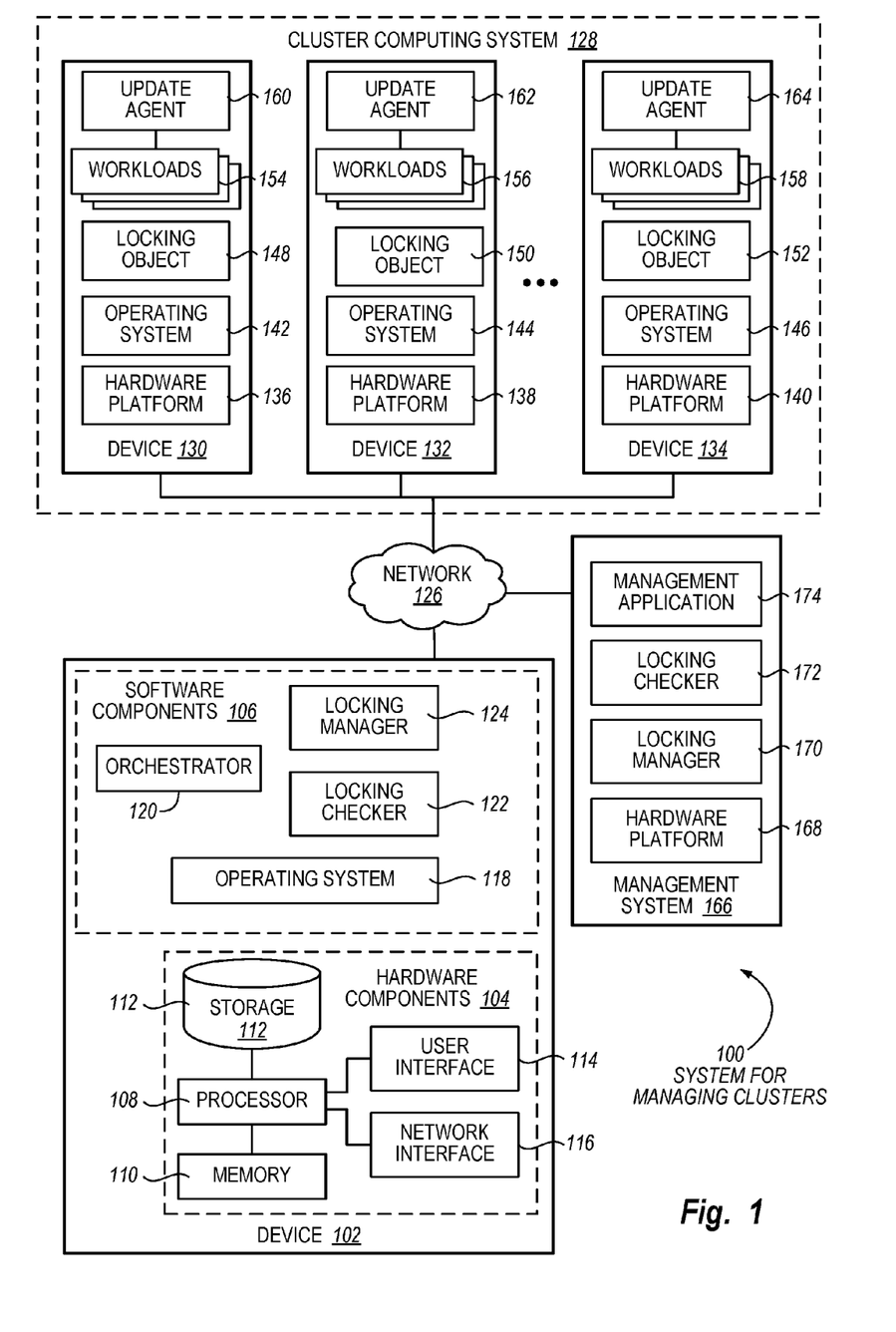
FIG. 1 is a diagram of an embodiment showing a network environment with an update locking system.

FIG. 1 is a diagram of an embodiment 100, showing a network environment in which a cluster computing system may be managed. Embodiment 100 is a simplified example of a system that may place locking objects on devices so that maintenance, updates, or other procedures may be performed on the devices in the cluster.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a system that may use a locking mechanism to lock the devices in a distributed computing system during an update or other maintenance. Embodiment 100 shows a device 102 that may install various locking objects on devices within a cluster computing system 128. The locking objects may be persistent objects that identify an update or other maintenance operation, and may indicate to other maintenance operations that the cluster is undergoing an operation.

Throughout this specification and claims, the term "target device" may be used as a shorthand notation to identify a device being updated or intending to be updated.

The locking objects may be respected by different maintenance systems that may operate on the cluster computing system 128. Each maintenance system may check for the presence of the locking objects prior to performing a maintenance task, and when a locking object is already present, the maintenance system may not start until the locking objects have been removed.

The locking objects may serve as a communications tool between different maintenance systems so that two maintenance systems may not perform operations that are incompatible or conflicting.

For example, a maintenance operation may be performed to update the BIOS or other firmware component of the devices within a cluster. Another maintenance operation may also be performed that updates the operating system. When the operating system update depends on the successful completion of the BIOS update, the BIOS update may be performed while locking out the operating system update. In the example, the BIOS update and operating system update may be performed by different instances of the same update system or by completely different update systems, yet the operating system update will not be performed until the BIOS update has completed its operation and removed the locking objects.

The locking objects may include an identifier that may identify the process coordinating the maintenance operation, the maintenance operation, or some other item. The identifier may be checked by a system attempting to access a cluster to determine if another process or operation is currently underway.

The locking objects may be persistent in that the locking objects may persist on the device until removed. The objects may persist across a system restart, reboot, update, or other operation until the same process that created the objects causes the objects to be removed.

Updating a distributed system may be performed in a sequence of updates, so that the distributed system may continue to operate during the update. During the update sequence, one or more devices may be prepared for updating by moving any executing workloads to other devices, then performing the updates. During the updates, the device may be restarted one or more times. After the update has completed, the workloads may be moved back to the device, returning the device to normal service. The update process may then move on to the next device in the system.

Many distributed systems may be designed with duplicate devices and workloads so that various services may have a very high availability. When the workloads and devices are duplicated, the services may be available even when one of the devices may be taken offline due to an issue with hardware, software, network, or other issue. During an update, an orchestrator may prepare a device for updating by configuring the distributed system for the update. In a typical embodiment, the workloads on a target device may be moved or relocated to other devices.

Some distributed systems may be prepared for updating by coordinating an update with a load balancing system or other management systems. In such embodiments, an orchestrator may indicate to a load balancer that a particular device will be taken offline. The load balancer may then start shifting incoming requests to other devices until the workloads operating on the target device may be unutilized. At such a point, the device may be halted.

In some embodiments, the locking objects may include executable code. Such embodiments may create a locking object that includes executable code that assists in an update or other change to the target device or performs some other function. Some such embodiments may include update scripts or executables that cause an update to be performed.

Some embodiments with executable code in the locking objects may execute a service that may reply to a query from a maintenance application. The maintenance application may query to determine whether the device was locked or not, and the executable code may reply with an identifier for the maintenance application that created the locking object.

Some embodiments may apply locking objects to only a subset of the devices in a cluster. Such embodiments may be used when only a portion of the devices undergo a maintenance operation. Other embodiments may apply locking objects to all the devices in a cluster, even when only a portion of the devices undergo a maintenance operation.

Some embodiments may place the locking objects in a predefined namespace. One example may be the Common Information Model (CIM) namespace. Such a namespace may define groups of classes and instances of objects. Objects stored in the namespace may define properties that may be queried by various applications and services. One application or service may define an object and another application or service may retrieve the object. In some embodiments, the locking objects may be placed in a namespace, such as the CIM namespace, in order to lock a device.

The device 102 may have a set of hardware components 104 and software components 106. The client device 102 may represent any type of device that may communicate with a live system 126.

The hardware components 104 may represent a typical architecture of a computing device, such as a desktop or server computer. In some embodiments, the client device 102 may be a personal computer, game console, network appliance, interactive kiosk, or other device. The client device 102 may also be a portable device, such as a laptop computer, netbook computer, personal digital assistant, mobile telephone, or other mobile device.

The hardware components 104 may include a processor 108, random access memory 110, and nonvolatile storage 112. The processor 108 may be a single microprocessor, multi-core processor, or a group of processors. The random access memory 110 may store executable code as well as data that may be immediately accessible to the processor 108, while the nonvolatile storage 112 may store executable code and data in a persistent state.

The hardware components 104 may also include one or more user interface devices 114 and network interfaces 116. The user interface devices 114 may include monitors, displays, keyboards, pointing devices, and any other type of user interface device. The network interfaces 116 may include hardwired and wireless interfaces through which the device 102 may communicate with other devices.

The software components 106 may include an operating system 118 on which various applications may execute.

An orchestrator 120 may be a software application that sequences updates to devices in the cluster computing system 128 and causes the updates or other management operation to be performed. The orchestrator 120 may use a locking checker 122 and locking manager 124 to lock and unlock the devices in the cluster.

The locking checker 122 may be a routine or set of routines that checks a device in the cluster to determine whether or not a locking object is present. In some embodiments, the locking checker 122 may test a locking object to determine whether or not the locking object is the correct object for a specific maintenance procedure.

The locking manager 124 may create and install locking objects on the various devices. The locking manager 124 may customize the locking object with an identifier that identifies the orchestrator 120 that may request to perform an update or other maintenance operation to a device.

The device 102 may be connected to a network 126 to access the cluster computing system 128. The cluster computing system 128 is merely one example of a distributed computing system that may use locking objects.

The cluster computing system 128 may contain multiple devices. Some cluster computing systems may have identical or nearly identical devices. Other distributed computing systems may have very different devices that make up the system.

Some cluster computing systems may have between two and sixteen devices, and sometimes more. Some distributed computing systems may have several to several hundreds of devices or even more.

The devices 130, 132, and 134 are shown with hardware platforms 136, 138, and 140, respectively. These hardware platforms may be similar to the hardware platform 104. Each of the devices may have an operating system 142, 144, and 146.

Each of the devices is illustrated as having a locking object 148, 150, and 152. The locking objects may be present when an orchestrator 120 is preparing to or in the process of performing an operation.

Each of the devices has a set of workloads 154, 156, and 158. Some embodiments may use update agents 160, 162, and 164 to perform the various maintenance tasks to the devices. The update agents 160, 162, and 164 are illustrated as operating on the respective workloads, but update agents may also be used to update the operating system, firmware, applications, services, or other components of the devices.

In some embodiments, the locking objects may contain some or all of the functionality of the update agents.

The update agents may respond to commands from the orchestrator 120. Some such commands may include scan, download, and install.

The scan command may determine if an update is available or applicable to the target device. In some cases, the scan command may include an identifier for a specific update to determine if the update has already been performed.

The download command may cause an installation package to be downloaded to the target device or made available to the target device for updating. The download command may cause the target device to prepare for the installation without actually performing the installation. In a typical use scenario, installation packages may be downloaded and prepared prior to giving the command to install the update. This may minimize the downtime of the update installation process by preparing for it ahead of time while the device is still operating normally.

The install command may cause the update to be installed. In some cases, the installation process may cause the target device to be restarted or rebooted one or more times. When the install command has completed, the plugin may return a success code or error code to the orchestrator.

Some embodiments may have multiple devices or processes that may perform maintenance operations. A management system 166 may have a hardware platform 168 and a management application 174 that may perform some maintenance operations. Because the management application 174 and orchestrator 120 may conflict on some operations, the management system 166 may include a locking manager 170 and locking checker 172.

When two or more maintenance or update processes are used to manage a cluster computing system, the locking system may be used to prevent one maintenance process from performing an operation while another maintenance process is also operating on the devices.

Figure 2:
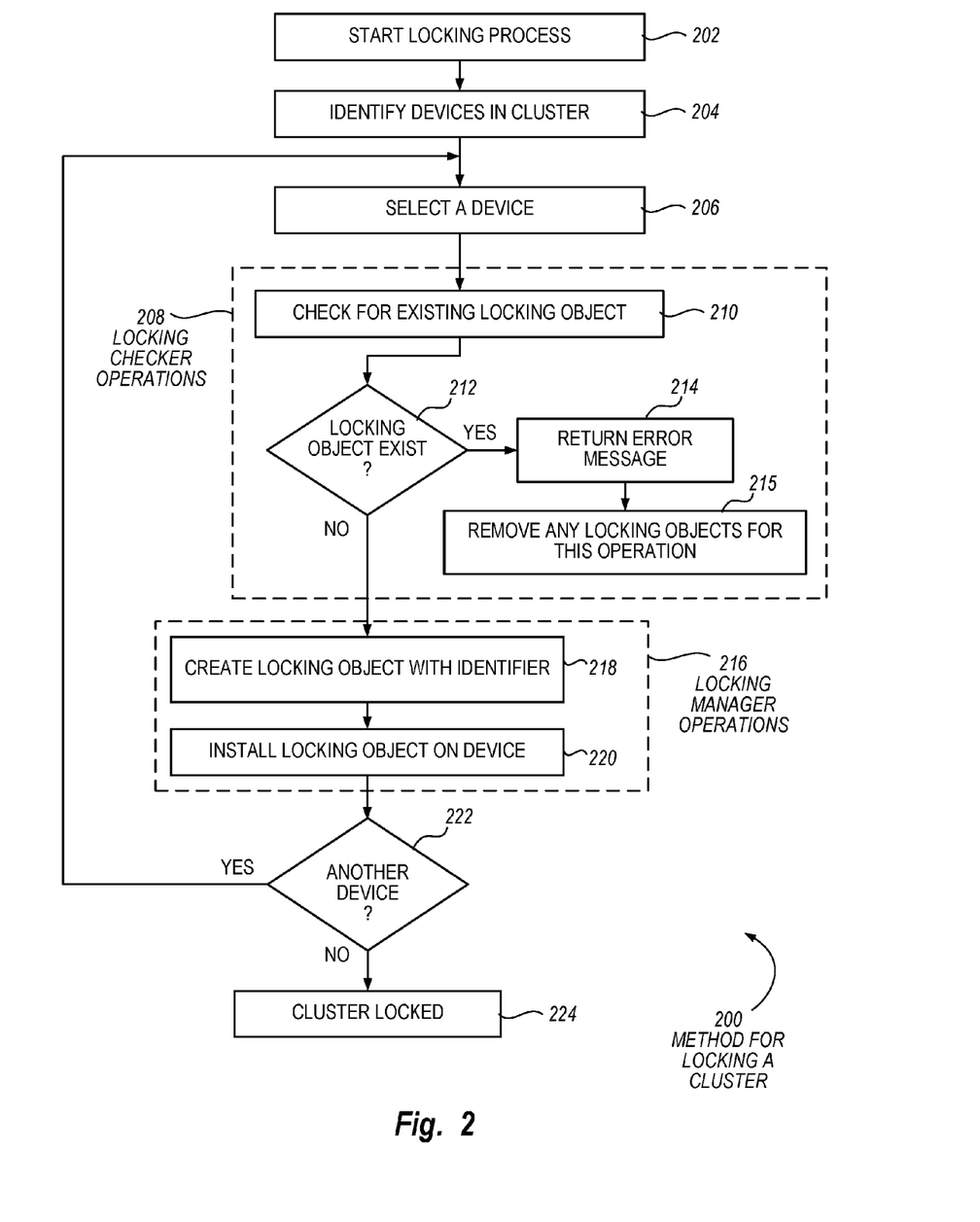
FIG. 2 is a flowchart of an embodiment showing a method for locking devices in a distributed processing system.

FIG. 2 is a flowchart illustration of an embodiment 200 showing a method for locking the computers of a distributed computing system. Embodiment 200 is a simplified example of a method that may be performed prior to actually performing a maintenance operation, such as an update, to devices in a cluster or other distributed computing system.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

In block 202, the locking process may begin.

The locking process may place a locking object on each of the devices in a distributed computing system. Prior to installing the locking object, the system may check for existing locking objects.

The devices to be processed in the cluster may be identified in block 204.

One of the devices may be selected in block 206, and the operations of a locking checker may be performed in block 208.

The locking checker operations of block 208 may include checking for an existing locking object in block 210. If the locking object exists in block 212, an error message may be returned in block 214 and any locking objects placed by the current process may be removed in block 215. The operations of block 215 may involve communication with other devices in the cluster to remove the locking objects.

If there are no existing locking objects found by the locking checker in block 208, the operations of the locking manager may be performed in block 216.

The locking manager may create a locking object with an identifier for the current process in block 218 and install the locking object onto the device in block 220.

If another device is to be processed in block 222, the process may return to block 206 to select a different device. When all of the devices are processed in block 222, the cluster may be considered locked in block 224.

Figure 3:
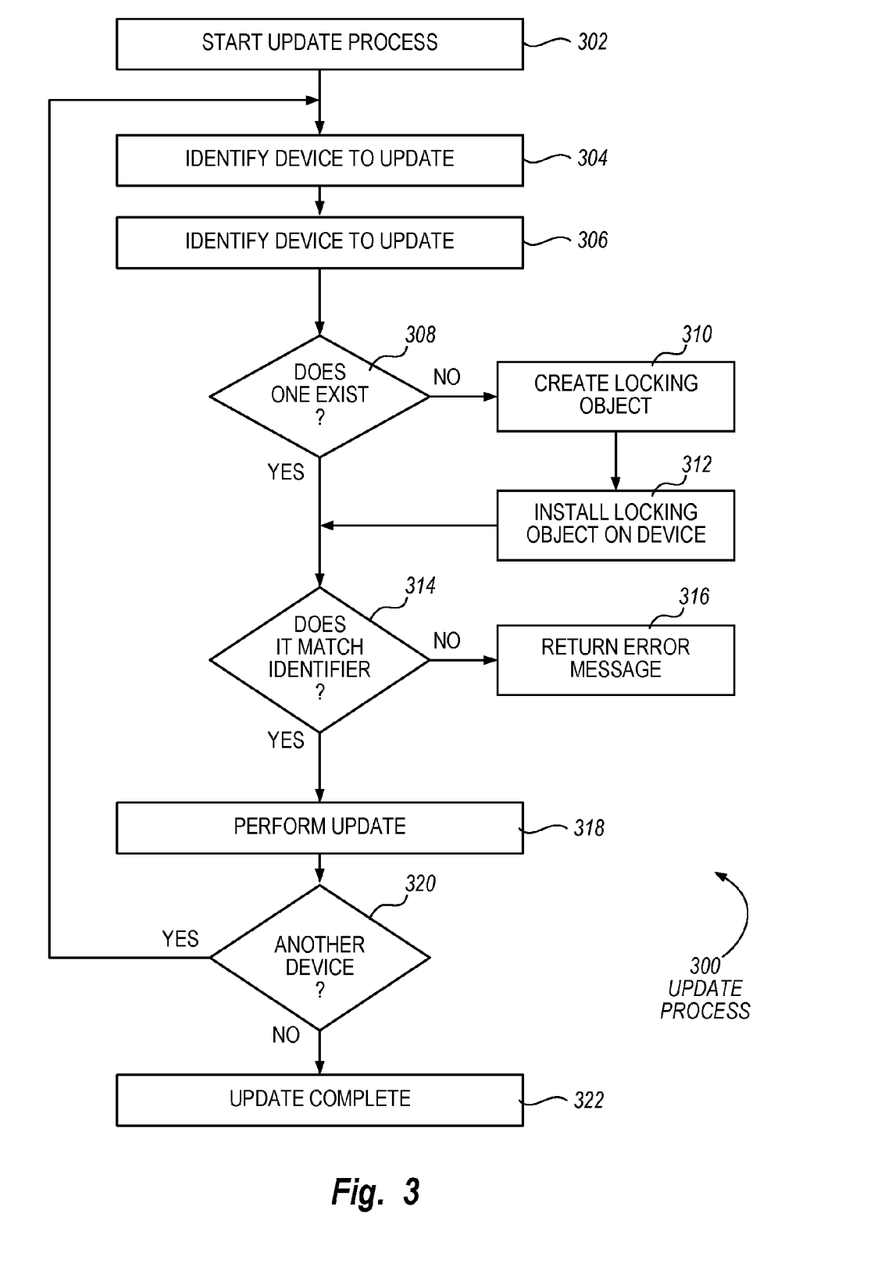
FIG. 3 is a flowchart of an embodiment showing a method for updating the devices in a distributed processing system using locking objects.

FIG. 3 is a flowchart illustration of an embodiment 300 showing a method for performing an update when locking objects are present. Embodiment 300 is a simplified example of a method that may be performed prior to actually performing a maintenance operation, such as an update, to devices in a cluster or other distributed computing system.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The update process may start in block 302.

The update process may verify that an operation may proceed by checking that the device is either already locked with a locking object for that particular process or by installing a locking object on the device prior to performing the update.

In block 304, the device to process may be identified. The device may be searched in block 306 to find a locking object. If a locking object does not exist in block 308, a locking object may be created in block 310 and installed on the device in block 312.

Embodiment 200 illustrated a method where all of the devices in a distributed processing system were locked prior to starting an update or other maintenance operation. In blocks 308 through 312, embodiment 300 may illustrate a different method whereby the locking objects may be installed as each device is updated.

The locking object may be analyzed in block 314 to determine if the identifier matches the existing process. If the locking object does not match the desired identifier in block 314, an error message may be returned in block 316.

The locking object may not match the identifier when another process has placed the locking object on the device. In such a case, the process may be halted for an administrator to determine how to rectify the situation. In some embodiments, the current process may undo any operations that have been performed, and then may wait until the second process's locking objects are removed.

If the locking object matches the identifier in block 314, the update may be performed in block 318.

If another device is to be serviced in block 320, the process may return to block 304 to begin operating on the other device. When all of the devices have completed in block 320, the update may be complete in block 322.

Figure 4:
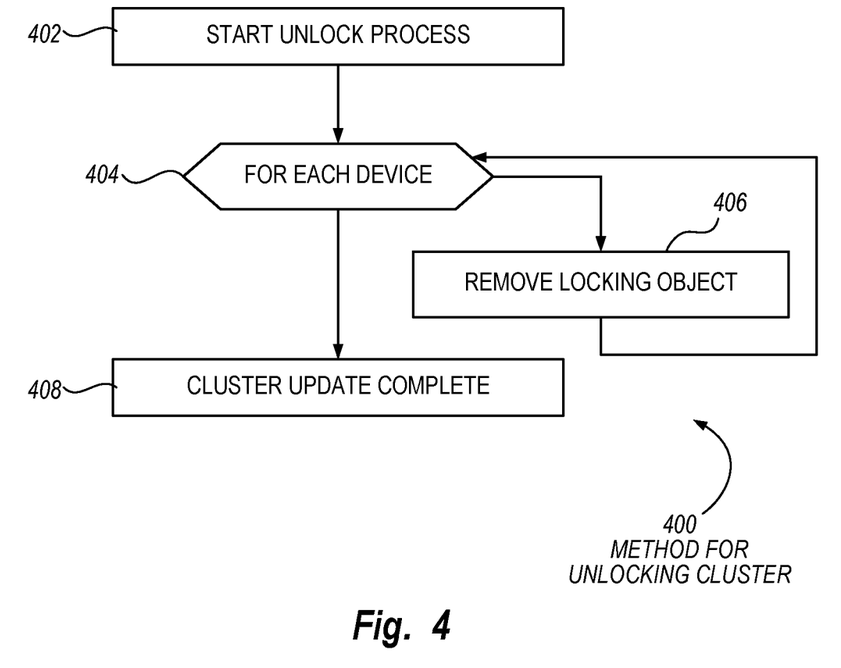
FIG. 4 is a flowchart of an embodiment showing a method for unlocking devices in a distributed processing system.

FIG. 4 is a flowchart illustration of an embodiment 400 showing a method for unlocking the computers of a distributed computing system after an update or other maintenance operation has been performed.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The unlock process may start in block 402.

Each device may be processed in block 404. For each device in block 404, the locking object may be removed in block 406. After completing each device in block 404, the cluster may be considered unlocked in block 408.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A computer system, the computer system comprising:
   one or more processors;
   system memory coupled to the one or more processors, the system memory storing instructions that are executable by the one or more processors; and
   the one or more processors executing the instructions stored in the system memory to update a computing device, including the following:
      access an identifier included in an object located at the computing device;
      determine that the identifier identifies the computer system as the owner of the object, the determination indicative of the computing device being locked by the computer system for update in a specified manner; and
      update the computing device in the specified manner.

2. The computer system of claim 1, further comprising the one or more processors executing the instructions to identify that the computing device is to be updated in the specified manner.

3. The computer system of claim 1, wherein the one or more processors executing the instructions to update the computing device in the specified manner comprise the one or more processors executing the instructions to update the computing device in the specified manner in response to the determination.

4. The computer system of claim 1, further comprising the one or more processors executing the instructions to:
   scan for objects at the computing device; and
   locate the object at the computing device.

5. The computer system of claim 1, further comprising the one or more processors executing the instructions to place the object, inducing the identifier, at the computing device.

6. The computer system of claim 1, wherein the one or more processors executing the instructions to update the computing device in the specified manner comprises the one or more processors executing the instructions to restart the computing device.

7. The computer system of claim 1, further comprising the one or more processors executing the instructions to remove the update object from the computing device to indicate that the computing device is free to perform other updates.

8. The computer system of claim 1, wherein the one or more processors executing the instructions to update the computing device in the specified manner comprises the one or more processors executing the instructions to update one of: a firmware component or an operating system.

9. A computer system, the computer system comprising:
   one or more processors;
   system memory coupled to the one or more processors, the system memory storing instructions that are executable by the one or more processors; and
   the one or more processors executing the instructions stored in the system memory to check the ability of a computing device to receive an update, including the following:
      access an identifier included in an object located at the computing device; and
      determine that the identifier identifies another computing device as the owner of the object, the determination indicative of the computing device being locked to perform an update associated with the other computing device such that the computing device is not available to receive another update from the computer system.

10. The computer system of claim 9, further comprising the one or more processors executing the instructions to identify that the computing device is to receive the other update to be updated in a specified manner.

11. The computer system of claim 9, wherein the one or more processors executing the instructions to determine that the identifier identifies the other computing device as the owner of the update object comprises determining that the other computing device is carrying out executable code included in the object as part of performing the update.

12. The method of claim 9, further comprising:
   place another object at the computing device, the other object including a further identifier identifying the computer system as the owner of the other object;
   locate the other object at the computing device;
   access the further identifier included in the other update object; and
   determine that the further identifier identifies the computer system as the owner of the other object; and
   update the computing device based on ownership of the other object.

13. A method for use at a computing device, the method for updating another computing device, the method comprising:
   accessing an identifier included in an object located at the other computing device;
   determining that the identifier identifies an update process as the owner of the object, the determination being indicative of the other computing device being locked for updating by the update process in a specified manner; and
   updating the other computing device in the specified manner in accordance with to the determination.

14. The method of claim 13, further comprising identifying that the other computing device is to be updated in the specified manner.

15. The method of claim 13, further comprising the one or more processors executing the instructions to:
   scan for objects at the computing device; and
   locate the object at the computing device.

16. The method of claim 13, further comprising prior to accessing the identifier, placing the object in a namespace at the other computing device.

17. The method of claim 13, wherein updating the other computing device in the specified manner comprises restarting the other computing device.

18. The method of claim 13, wherein updating the other computing device in the specified manner comprises executing an update script.

19. The method of claim 13, wherein updating the other computing device in the specified manner comprises updating one of: a firmware component or an operating system at the other computing device.

20. The method of claim 13, wherein accessing an identifier included in an object located at the other computing device comprises accessing the identifier included in the object located at a computing device that is included in a cluster of computing devices.

\* \* \* \* \*